United States Patent [19]

Tabata et al.

[11] Patent Number: 5,667,741
[45] Date of Patent: Sep. 16, 1997

[54] METHOD OF MANUFACTURING A MOLDING FOR ENERGY ABSORBENT PADS AND MOLD USED IN THE METHOD

[75] Inventors: Keiichiro Tabata, Chigasaki; Yoichi Nabeshima, Zama; Taikyu Fujita, Yokohama; Kazufumi Yokoyama, Yokosuka; Torao Hashimoto, Yokohama, all of Japan

[73] Assignee: Bridgestone Corporation, Tokyo, Japan

[21] Appl. No.: 628,233

[22] Filed: Apr. 4, 1996

[30] Foreign Application Priority Data

Dec. 20, 1995 [JP] Japan .................................... 7-349134

[51] Int. Cl.[6] .................................................. B29C 44/10
[52] U.S. Cl. .................................................. 264/54; 425/4 R
[58] Field of Search .......................... 264/54, 53; 425/4 R

[56] References Cited

U.S. PATENT DOCUMENTS

5,587,183  12/1996  Clark et al. .............................. 425/4 R

*Primary Examiner*—Mary Lynn Theisen
*Attorney, Agent, or Firm*—Sughrue, Mion, Zinn, Macpeak and Seas

[57] ABSTRACT

Disclosed herein is a method of manufacturing a rigid polyurethane foam molding for energy absorption, including the steps of introducing a rigid polyurethane foam raw material composed primarily of a polyhydroxy compound and a polyisocyanate compound into a cavity in a mold, and blowing and reacting the rigid polyurethane foam raw material in the cavity, wherein a pack ratio of a core portion of the molding ranges from 0.5 to less than 1.2. Accordingly, the rigid polyurethane foam molding can obtain a plateau value comparable to that of a rigid polyurethane foam slab stock foam suitable for an energy absorbent pad.

9 Claims, 4 Drawing Sheets

METHOD OF MANUFACTURING A MOLDING FOR ENERGY ABSORBENT PADS AND MOLD USED IN THE METHOD

BACKGROUND OF THE INVENTION

1. Field of the Invention

The present invention relates to a method of manufacturing a rigid polyurethane foam molding for energy absorption and a mold used in this method, and more particularly to a method of manufacturing a rigid polyurethane foam molding suitable for an energy absorbent pad to be mounted inside a door trim of an automobile to absorb energy upon collision of the automobile and thereby protect a passenger, and also to a mold used in this method.

2. Prior Art

Conventionally, expanded thermoplastic resin products formed from thermoplastic resins such as polystyrene, polyethylene, and polypropylene are used to absorb impact energy upon collision of the automobile. However, such an expanded thermoplastic resin has a problem such that its energy absorbing characteristics vary widely according to its surroundings and the temperature upon using, and the amount of energy absorption is remarkably decreased especially under high-temperature conditions. Furthermore, the relation between strain and stress representing the energy absorbing characteristics in the expanded thermoplastic resin is such that stress tends to increase continuously with an increase in strain, so that the expanded thermoplastic resin is unsuitable for use in the situation that a large amount of energy absorption is desired in the stress range up to the upper limit.

On the contrary, a polyurethane foam as a thermosetting resin, especially, a rigid polyurethane foam having a high cross-linking density has many advantages such that the range of variation in energy absorbing characteristics with temperature is small, a so-called plateau value is large, and the polyurethane foam is suitable for use under high-temperature conditions.

The relation between strain and stress in the conventional rigid polyurethane foam is better than that in the expanded thermoplastic resin in such a manner that stress is less changed with a change in strain. However, the conventional rigid polyurethane foam is not yet satisfactory in its energy absorbing characteristics. For example, the characteristics include a yield point through which stress once increases and thereafter decreases with an increase in strain. It is therefore desired to develop a rigid polyurethane foam having such energy absorbing characteristics that stress is constant as possible irrespective of a change in strain and the energy absorption is high.

The present assignee has already proposed a rigid polyurethane foam having no yield point in the relation between strain and stress, so as to satisfy the above desire (Japanese Patent Application Kokai No. 5-331365, for example).

The rigid polyurethane foam thus proposed is usually manufactured as a slab stock foam, and this slab stock foam is cut into a desired shape suitable for an energy absorbent pad. However, the slab stock foam cutting process requires a considerable amount of man-hours, and also generates foam particles due to cutting, which particles cause a serious problem in disposal.

Furthermore, since the slab stock foam is cut with a cutter, there is a limitation in shape of the product, so that it is difficult to obtain a complex shape. In addition, the foam particles generated in cutting the slab stock foam adhere to the resulting product, and they sometimes scatter or adhere to the surface of another member such as a door trim, for example, in assembling the product and the door trim or in any afterprocessing, thus causing bad appearance to the door trim, etc.

SUMMARY OF THE INVENTION

It is accordingly an object of the present invention to provide a method of manufacturing a rigid polyurethane foam molding which can solve the above problems. That is, it is conventionally known that a rigid polyurethane foam molding is somewhat inferior in plateau value to a rigid polyurethane slab stock foam, and the present invention has improved this respect to obtain a rigid polyurethane foam molding comparable in plateau value to a rigid polyurethane slab stock foam suitable for an energy absorbent pad.

The present inventors have greatly investigated to attain the above object and have found out the following manufacturing method for a molding that has attained the above object.

According to the present invention, there is provided a method of manufacturing a rigid polyurethane foam molding for energy absorption, comprising the steps of introducing a rigid polyurethane foam raw material composed primarily of a polyhydroxy compound and a polyisocyanate compound into a cavity in a mold, and blowing and reacting the rigid polyurethane foam raw material in the cavity, wherein a pack ratio of a core portion of the molding ranges from 0.5 to less than 1.2. Preferably, the pack ratio ranges from 0.6 to 1.1, and the aspect ratio of the shape of each cell forming the rigid polyurethane foam is 1.2 or more, preferably ranges from 1.2 to 10.0.

More specifically, there is provided a method of manufacturing a rigid polyurethane foam molding for energy absorption, comprising the steps of introducing a rigid polyurethane foam raw material composed primarily of a polyhydroxy compound and a polyisocyanate compound into a cavity in a mold, and blowing and reacting the rigid polyurethane foam raw material in the cavity, wherein a pack ratio of a core portion of the molding ranges from 1.0 to less than 1.2, and the rigid polyurethane foam raw material is blown and reacted in a condition where an upper die and a lower die of the mold are spaced a distance of 2 mm or more from each other so that the aspect ratio of the shape of each cell forming the rigid polyurethane foam becomes 1.2 or more.

Alternatively, the rigid polyurethane foam molding having a pack ratio ranging from 0.5 to less than 1.2 may be manufactured by first introducing the rigid polyurethane foam raw material into the cavity, next evacuating the cavity of the mold, and then blowing and reacting the raw material in the cavity evacuated. Also by this method, a molding suitable for an energy absorbent pad may be effectively obtained. Further, there is also provided a mold for manufacturing a rigid polyurethane foam molding by introducing a rigid polyurethane foam raw material composed primarily of a polyhydroxy compound and a polyisocyanate compound into a cavity defined by separatably joining an upper die and a lower die, and blowing and reacting the rigid polyurethane foam raw material in the cavity, wherein the lower die has a lower die cavity for blowing the cavity when the upper die and the lower die are joined together; a fine space is defined at an outer circumferential edge of an upper end of the lower die cavity so as to communicate with the lower die cavity; the upper die has a hollow chamber so as to communicate with the cavity through the fine space; an air pipe is connected at one end thereof to the upper die so as to communicate with the hollow chamber and connected at the other end to an air suction device; the rigid polyurethane foam raw material is introduced into the cavity; and the air suction device is operated to evacuate the cavity through the air pipe, the hollow chamber, and the fine space, and then blown and reacted in the cavity, so as to form the rigid polyurethane foam molding with a core portion having a pack ratio ranging from 0.5 to less than 1.2.

In this manner, the rigid polyurethane foam molding with the core portion having a pack ratio ranging from 0.5 to less than 1.2 can be obtained by maintaining a reduced pressure in the cavity during the blowing and reaction process. That is, excepting a conventional method wherein a partial-closed mold such that an upper die and a lower die are spaced a distance of 2 mm or more from each other is used to perform foaming, a usual method of forming a blown molding by introducing a rigid polyurethane foam raw material into a full-closed mold gives rise to a high pack ratio of 1.5 or more in the rigid polyurethane foam molding obtained. In contrast, by evacuating the cavity of the mold, a high degree of blowing can be obtained even with a less injection amount of raw material. Accordingly, the pack ratio of the core portion of the rigid polyurethane foam molding can be reduced to 0.5 to less than 1.2 with no defects.

Further, by using the mold featured by the configuration that the hollow chamber is defined in the upper die and the fine space is defined at the outer circumferential edge of the upper end of the lower die cavity so as to communicate with the lower die cavity when the upper and lower dies are joined together, the formation of a flash can be restricted at this fine space, thus reducing the flash generation and accordingly simplifying a deflashing process.

Other objects and features of the invention will be more fully understood from the following detailed description and appended claims when taken with the accompanying drawings.

DETAILED DESCRIPTION OF THE INVENTION

As described above, the manufacturing method for the rigid polyurethane foam molding according to the present invention is a method of manufacturing a rigid polyurethane foam molding by blowing and reacting in a mold cavity a rigid polyurethane foam raw material containing a polyhydroxy compound and a polyisocyanate compound as primary components and compounding a catalyst, blowing agent, foam stabilizer, and other auxiliaries if desired in the primary components. In the manufacturing method, the pack ratio of the core portion of the molding is set to a specific range, and the aspect ratio of each cell forming the foam is specified to thereby ensure a desired plateau value, thus obtaining a molding having excellent energy absorptivity and no yield point.

In particular, the positional relation between the upper die and the lower die of the mold used in the manufacturing method for the molding according to the present invention is specified. That is, a space of 2 mm or more is defined between the upper die and the lower die in blowing and reacting the rigid polyurethane foam raw material in the mold cavity, thereby setting the pack ratio of the core portion of the molding to the range of 1.0 to less than 1.2.

Further, the pack ratio of the core portion of the molding can also be set to the range of 0.5 to less than 1.2 preferably by evacuating the mold cavity and blowing and reacting the rigid polyurethane foam raw material in this evacuated condition.

As described above, the rigid polyurethane foam raw material used in the present invention contains a polyhydroxy compound and a polyisocyanate compound as primary components and compounds a catalyst, blowing agent, foam stabilizer, and other auxiliaries if desired in the primary components.

The polyhydroxy compound used in the present invention is not particularly limited to any specific compounds. Examples of the polyhydroxy compound include polyether polyols obtained by ring-opening addition polymerization of glycerol, sucrose, ethylene diamine, etc. and alkylene oxides such as ethylene oxide and propylene oxide; and polyester polyols obtained by polycondensation of polybasic acids such as adipic acid and succinic acid and polyhydroxy compounds such as ethylene glycol and propylene glycol or by ring-opening polymerization of lactones. One of these examples may be solely used, or two or more of these examples may be used in combination. To improve the heat resistance of the rigid polyurethane foam molding in the present invention, it is preferred to set the average hydroxyl value of all the polyhydroxy compounds used to 200 or more, preferably 300 or more. The upper limit may be 10,000.

The polyisocyanate compound used in the present invention is also not particularly limited to any specific compounds. Examples of the polyisocyanate compound include aromatic isocyanates such as diphenylmethane diisocyanate and tolylene diisocyanate; alicyclic isocyanates such as isophorone diisocyanate; aliphatic isocyanates such as hexamethylene diisocyanate; and their crude products. One of these examples may be solely used, or two or more of these examples may be used in combination.

The amount of the polyisocyanate used to the total amount of the polyhydroxy compound and any compounds having active hydrogens, such as water, i.e., the isocyanate index, is preferably set to the range of 80 to 130 in the case of manufacturing an ordinary rigid polyurethane foam, or to the range of 150 to 350 in the case of manufacturing an isocyanurate modified rigid polyurethane foam.

The catalyst compounded in the foam raw material in the present invention may be selected from known compounds used for the manufacture of rigid polyurethane foams. Examples of the catalyst include organometallic compounds such as dibutyltin dilaurate, lead octoate, and stannous octoate; amine compounds such as triethylenediamine and tetramethylhexamethylenediamine; and any compounds used for isocyanurate modification, such as N,N',N"-tris (diaminopropyl)hexahydro-s-triazine, potassium acetate, and potassium octoate. The compounding amount of the catalyst is in the range of preferably 0.1 to 10.0 parts by weight per 100 parts by weight of the polyhydroxy compound.

The blowing agent compounded in the foam raw material may be selected from known compounds used for the manufacture of rigid polyurethane foams. Examples of the blowing agent include water; chlorofluorocarbons such as trichlorofluoromethane and 1,1,2-trichloro-1,2,2-trifluoroethane; hydrochlorofluorocarbons such as dichlorotrifluoroethane and dichlorotetrafluoroethane; hydrochlorocarbons such as methylene chloride; hydrofluorocarbons such as hexafluoropropane; and hydrocarbons such as pentane. Of these examples, water is most preferable from the viewpoint of influence on the environment due to diffusion into the atmosphere. The compounding amount of water is in the range of preferably 0.5 to 10 parts by weight per 100 parts by weight of the polyhydroxy compound.

The foam stabilizer compounded in the foam raw material may be selected from all known compounds effective for the manufacture of rigid polyurethane foams. Examples of the foam stabilizer include polyoxyalkylene compounds such as polyoxyalkylene alkylether, and silicone compounds such as organopolysiloxane. In the present invention it is preferred to use a foam stabilizer having a surface tension ranging from 16 to 22 dyn/cm, preferably from 18 to 21.5 dyn/cm. If the surface tension of the foam stabilizer is less than 16 dyn/cm, an undesired phenomenon such as roughness of each cell wall surface may sometimes occur. On the other hand, if the surface tension of the foam stabilizer is greater than 22 dyn/cm, the shape of each cell forming the rigid polyurethane foam obtained becomes nearly spherical, which may sometimes cause a disadvantage such that stable buckling of the foam cannot be obtained in application of a fixed stress. The compounding amount of the foam stabilizer is in the range of preferably 0.1 to 10.0 parts by weight per 100 parts by weight of the polyhydroxy compound.

The foam raw material in the present invention may further contain any appropriate components in addition to the above-mentioned components, such as a fire retardant, in such a proportion as not to hinder the object of the present invention.

Optionally, powder having an average particle size of 0.05 to 100 μm may be further compounded as one of the components of the foam raw material in an amount of 1 to 200 parts by weight per 100 parts by weight of the polyhydroxy compound. By compounding such powder in the foam raw material, the powder is dispersed to exist in the membrane of each cell forming the foam, thereby making a stress constant irrespective of a change in strain upon compression of the rigid polyurethane foam, eliminating a yield point, and improving the efficiency of energy absorption. Although the mechanism of this effect is not clarified, it is assumed that the presence of such foreign powder may make constant the fracture stress of each cell.

Examples of the powder include inorganic compounds such as calcium carbonate and aluminum hydroxide; metals such as iron and aluminum; and organic compounds such as polyamide, polyvinyl chloride, and melamine. One of these examples may be solely used, or two or more of these examples may be used in combination.

As described above, the average particle size of the powder is in the range of 0.05 to 100 μm, preferably 0.5 to 50 μm, more preferably 1 to 30 μm. If the average particle size of the powder is smaller than 0.05 μm, a point of stress concentration cannot be formed, and if the average particle size of the powder is larger than 100 μm, the powder cannot be used in a usual rigid polyurethane foaming machine.

While the rigid polyurethane foam raw material is first introduced into the cavity of the mold, and then blown and reacted in the cavity as mentioned above, the opposed surfaces of the upper and lower dies of the mold are not completely closed, but a spacer having a thickness of 2 mm or more, preferably 2 to 10 mm, more preferably 2 to 5 mm, is provided between the opposed surfaces of the upper and lower dies. The provision of the spacer allows a decrease in the pack ratio of the core portion of the molding obtained by the present invention as compared with that of a conventional molding. However, the rigid polyurethane foam raw material can be blown and reacted in a condition close to free blowing, that is, in a condition close to blowing of a slab. Accordingly, the pack ratio of the core portion of the rigid polyurethane foam molding can be set to the range of 1.0 to less than 1.2, preferably 1.0 to 1.1, and the aspect ratio of the shape of each cell in the molding can be set to 1.2 or more, preferably 1.3 to 2.1.

Alternatively, blowing is carried out under a reduced pressure after introducing the rigid polyurethane foam raw material into the mold cavity and evacuating the cavity of the mold. In this case, the pack ratio of the core portion of the rigid polyurethane foam molding can be set to the range of 0.5 to less than 1.2, preferably 0.6 to 1.1, and the aspect ratio of the shape of each cell in the mold can be set to 1.2 or more, preferably 1.2 to 10.

The reduced pressure degree in the mold cavity is preferably in the range of −5 mmHg to about −500 mmHg, particularly −100 mmHg to −400 mmHg. The reduced pressure degree is proportional to the introduction proportion of the rigid polyurethane foam raw material into the mold cavity. For example, the relation is such that when the reduced pressure degree is −100 mmHg, −200 mmHg and −300 mmHg, the introduction proportion of the raw material into the mold cavity is about −10%, about −20% and about −30%, respectively. Accordingly, by reducing a pressure in the mold, the introduction amount of the rigid polyurethane foam raw material into the mold cavity can be reduced, thereby obtaining a rigid polyurethane foam molding having a low density. If the amount of the raw material to be introduced into the mold cavity is +20% or more, a considerable flash would occur. If the reduced pressure degree is over −500 mmHg, the mold may deform. To avoid this problem, it is required to reinforce the mold. This is not economical.

The pack ratio is defined herein as the ratio of the density of the core portion of the molding to the density of the core portion of the slab (slab stock foam). By specifying the range of the pack ratio in the rigid polyurethane foam molding as mentioned above, a large plateau value of the molding can be obtained. The core portion is a portion in which the skin layer at the surface portion is excluded or removed.

Further, the plateau is defined herein as a portion of a sample of the molding such that when the sample is gradually compressed up to 80% in the direction of its thickness, the stress generated in the range of compression ratio of 20 to 80% falls within the range of 50%-compression stress value±20%. The plateau value, or the length of the plateau is represented by an upper limit (%) of the compression ratio range. When the stress at a compression ratio of 20% falls within the range of 50%-compression stress value±20%, the measurement of the plateau value is read from 0.

In general, the plateau value and the 50%-compression stress value are adopted as the characteristic values required for energy absorbing materials (energy absorbent pads). In forming the rigid polyurethane foam molding, the 50%-compression stress value can be easily changed by changing the amount of the blowing agent to be used. Accordingly, a desired energy absorbent pad can be obtained without the need for design change of the mold, for example.

The rigid polyurethane foam molding obtained by the present invention can be used as an energy absorbent pad without the need for cutting the product, thereby solving various problems due to cutting of the product. Furthermore, since the plateau value of the molding in the present invention can be increased to about 70%, the molding is comparable in plateau value to the conventional product obtained by cutting a slab stock foam. Accordingly, such a large plateau value of the molding in the present invention allows the molding to absorb energy with a constant stress in receiving a shock, thus obtaining an excellent energy absorbing material (energy absorbent pad).

The relation between the pack ratio and the plateau value in the rigid polyurethane foam molding obtained by the present invention will now be described. In the process of blowing and reacting the rigid polyurethane foam raw material, it is known that when the pack ratio is small, that is, in the condition of free blowing as in obtaining a slab stock foam, the shape of each cell forming the rigid polyurethane foam becomes long in a foaming direction, whereas when the pack ratio is large, the shape of each cell becomes close to a spherical shape.

If the shape of each cell forming the foam becomes close to a spherical shape, it is considered that the stroke of buckling for an input in the direction of the major axis of each cell becomes short, with the result that a buckling region with a constant stress, i.e., an effective strain range, is reduced also in the macroscopic stress-compression ratio characteristic of the foam as an aggregate of the cells, then reducing the efficiency of energy absorption. In general, the stress itself to be generated is also related with the ratio of the major axis to the minor axis (the aspect ratio) of the elliptic shape of each cell forming the foam. When this ratio is large, the stress in the direction of the major axis becomes the highest value.

In the energy absorbent pads formed from the rigid polyurethane foam molding of the present invention, the aspect ratio of the shape of each cell has been made fall within a preferable range for an energy absorbent pad by setting the pack ratio of the core portion to the range of 0.5 to less than 1.2, which is small in spite of the molding. In other words, since the pack ratio of the core portion of the molding is set to the range of 0.5 to less than 1.2, the shape of each cell forming the foam becomes vertically long. As a result, the aspect ratio of each cell in the present invention becomes 1.2 or more, preferably 1.2 to 10.0. In comparison, the aspect ratio of a slab stock foam is usually 2.04±15% and the aspect ratio of a conventional molding is less than 1.2.

Figure 3:
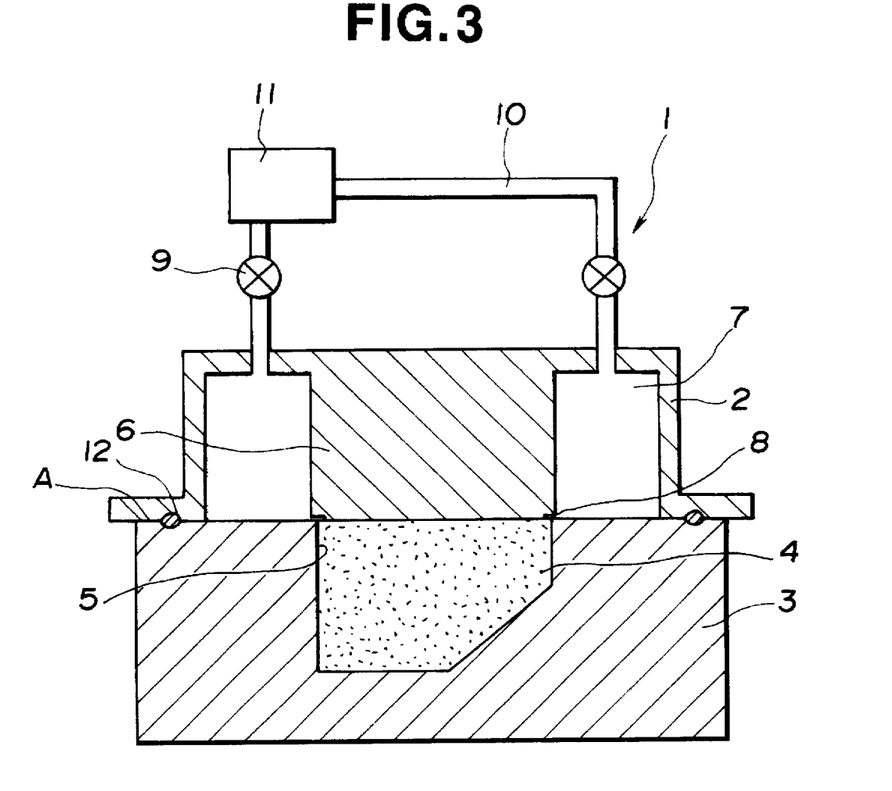
FIG. 3 is a sectional view showing a mold according to another preferred embodiment of the present invention.

In the mode where the blowing and reaction in the mold cavity is performed in an evacuated condition of the mold cavity, a mold as shown in FIG. 3 is preferably used.

Referring to FIG. 3, reference numeral 1 generally denotes a mold consisting of an upper die 2 and a lower die 3. The upper die 2 and the lower die 3 are separatably joined together. The lower die 3 is formed at its upper central portion with a recess (lower die cavity) 4, and the upper die 2 is formed as a cover for closing an upper opening of the recess 4. In the joined condition of the upper and lower dies 2 and 3, the recess (lower die cavity) 4 defines a cavity 5 of the mold 1. The upper die 2 has a closing portion 6 for closing the upper opening of the recess 4 of the lower die 3, thus defining a hollow chamber 7. The outer circumferential edge of the lower end of the closing portion 6 is cut out partially or over the circumference to form a fine space 8. Accordingly, when the upper die 2 is joined to the lower die 3, the chamber 7 and the recess (lower die cavity) 4 make communication with each other through the fine space 8. The width of the fine space 8 is set to 0.005 to 1 mm, preferably 0.01 to 0.5 mm from the viewpoint of eliminating steps for removing flash in the post-treatment and precisely forming a mold. The numeral 12 indicates an air seal packing.

An air pipe 10 with a pressure regulating valve 9 is connected at one end thereof to the upper die 2 so as to communicate with the chamber 7, and the other end of the air pipe 10 is connected to an air suction device 11 such as a vacuum pump.

Figure 4:
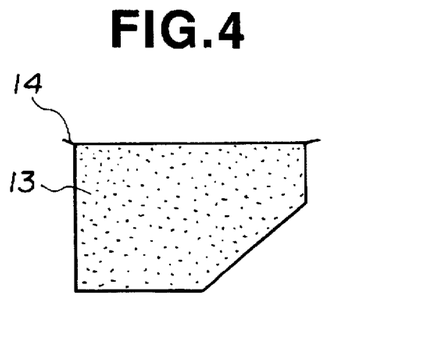
FIG. 4 is a sectional view of a foam obtained by using the mold shown in FIG. 3.

In forming the energy absorbent pad molding by using this mold 1 according to the present invention, a rigid polyurethane foam raw material is introduced into the cavity and the upper die 2 is joined to the lower die 3. The air suction device 11 is actuated from the beginning of the operation, while joining the dies or after joining the dies. As a result, the air inside the cavity 5 (lower die cavity 4) is sucked through the chamber 7 and the fine space 8, thereby evacuating the cavity 5, and the raw material is blown and reacted. When a desired reduced pressure is reached, the valve 9 is closed. Thus, a rigid polyurethane foam molding 13 having a pack ratio of 0.5 to less than 1.2 can be obtained as shown in FIG. 4. Although the molding 13 has a flash 14 corresponding to the fine space 8 as shown in FIG. 4, the flash 14 is very fine, so that the removal of the flash 14 and any other aftertreatments of the molding can be easily made.

Figure 6:
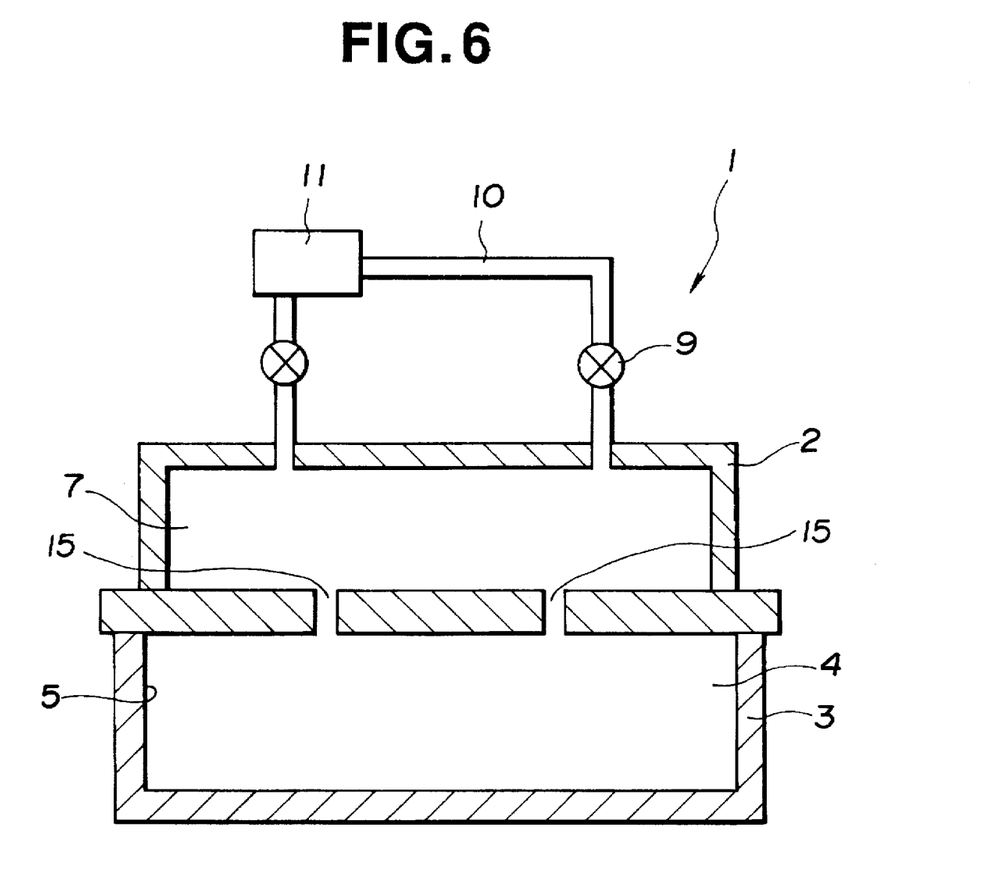
FIG. 6 is a sectional view showing a mold according to still another preferred embodiment of the present invention.

The mold 1 shown in FIG. 3 is illustrative, and another mold as shown in FIG. 6 may be used. In the mold shown in FIG. 6, a lower wall of an upper die 2 is formed with a plurality of vent holes 15 for making communication of a chamber 7 and a cavity 5. However, the mold shown in FIG. 6 is inferior to the mold shown in FIG. 3, because the foam generated in the blowing and reaction process may enter the vent holes 15 to cause a difficulty of mold opening or release due to the adherence of the foam to the upper die 2 in separating the upper die 2 from the lower die 3. Accordingly, the mold as shown in FIG. 3 is more preferable.

As described above, according to the present invention, the rigid polyurethane foam molding can be used as an energy absorbent pad without the need for any afterforming processes. Further, the molding obtained has a reduced pack ratio of the core portion, thereby reducing variations in stress-strain characteristic between products. Further, the plateau value of the molding obtained can be increased to about 70%, thereby allowing the application of the molding as it is to the energy absorbent pad. Since the molding is used as it stands, the cutting process can be eliminated to thereby eliminate any limitations to the shape of the product and solve the problem due to the generation of particles of the molding by cutting.

The present invention will now be described more specifically by way of examples and comparisons, but it is to be noted that the present invention is not limited to the following examples.

EXAMPLE AND COMPARISON, I

In accordance with the compounding ratios shown in Table 1, various rigid polyurethane foam moldings and a slab stock foam were prepared.

Figure 1:
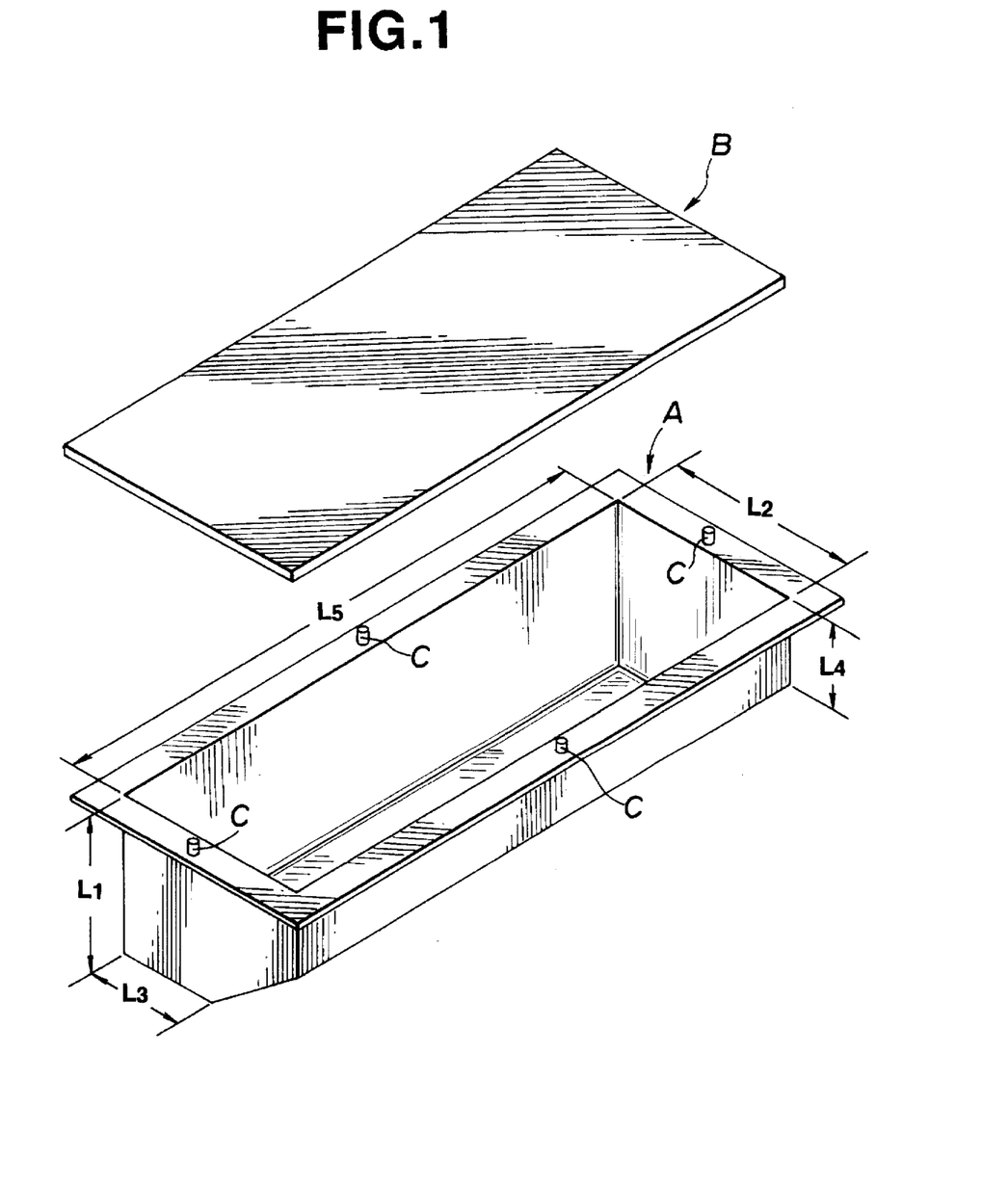
FIG. 1 is an exploded perspective view of a mold as an example used to obtain moldings according to a preferred embodiment of the present invention.

FIG. 1 shows a mold used to prepare the moldings. As shown in FIG. 1, this mold is composed of an aluminum lower die A having a pentagonal cross section and an aluminum upper die B for closing an upper opening of the lower die A. The dimensions of this mold are $L_1=80$ mm, $L_2=90$ mm, $L_3=50$ mm, $L_4=40$ mm, and $L_5=270$ mm as shown. This mold was used to obtain an energy absorbent pad for a door trim.

In using this mold, a plurality of spacers C were interposed between the opposed surfaces of the lower die A and the upper die B to adjust a pack ratio.

On the other hand, the slab stock foam was prepared by first forming a foamed body by free blowing in a box having the dimensions of 200 mm (height)×300 mm×300 mm, and then cutting the foamed body with a cutter to obtain a sample for compression stress measurement.

The properties of the rigid polyurethane foam samples obtained were examined by the following methods. The density of the rigid polyurethane foam was measured in accordance with JIS-A-9514. The 50%-compression stress was measured by using an autograph manufactured by Shimadzu Seisakusho as a compression test machine, in which the compression speed was 50 mm/min and the compression direction was a blowing direction. Each sample used for testing was a cube having one side of 50 mm, cut from the core portion of the rigid polyurethane foam.

In Comparison $a_2$, the pack ratio was 1.50; the aspect ratio was 0.80; and the plateau value was so greatly low as 10.

Comparisons $b_1$, $b_2$, and $b_3$

In Comparisons $b_1$, $b_2$, and $b_3$, the samples were prepared from the moldings obtained by the blowing and reaction process in a condition where the upper and lower dies A and B are spaced from each other; however, the pack ratio was set higher than the range specified by the present invention and the aspect ratio was set lower than the range specified by the present invention.

The samples in all of Comparisons $b_1$, $b_2$, and $b_3$ have low plateau values, so that they are not preferable as energy absorbent pad moldings.

Examples $c_1$, $c_2$, and $c_3$

The samples in Examples $c_1$, $c_2$, and $c_3$ were prepared by setting the pack ratio and the aspect ratio within the respective ranges specified by the present invention, in which the space between the upper die A and the lower die B was changed in accordance with the present invention by changing the height of each spacer C.

In Examples $c_1$, $c_2$, and $c_3$, the plateau values were very close to those in Comparison $a_1$ adopting the free blowing. Accordingly, the moldings obtained in Examples $c_1$ to $c_3$ can be adopted without any changes as side-impact energy absorbent pads for automobiles.

TABLE 1

|  | Comparison | | | | | Example | | | |
| --- | --- | --- | --- | --- | --- | --- | --- | --- | --- |
|  | $a_1$ | $a_2$ | $b_1$ | $b_2$ | $b_3$ | $c_1$ | $c_2$ | $c_3$ | $c_4$ |
| Polyhydroxy compound*[1] | 100 | 100 | 100 | 100 | 100 | 100 | 100 | 100 | 100 |
| Polyisocyanate compound*[2] | 146 | 146 | 146 | 146 | 146 | 146 | 146 | 146 | 164 |
| Foam stabilizer*[3] | 2 | 2 | 2 | 2 | 2 | 2 | 2 | 2 | 2 |
| Fire retardant*[4] | 10 | 10 | 10 | 10 | 10 | 10 | 10 | 10 | 10 |
| Blowing agent (water) | 2.4 | 2.4 | 2.4 | 2.4 | 2.4 | 2.4 | 2.4 | 2.4 | 3.45 |
| Catalyst*[5] | 1 | 1 | 1 | 1 | 1 | 1 | 1 | 1 | 1 |
| Powder*[6] | 30 | 30 | 30 | 30 | 30 | 30 | 30 | 30 | 30 |
| Foam density (OA) g/cm$^3$ | 0.060 | 0.102 | 0.092 | 0.086 | 0.083 | 0.080 | 0.075 | 0.072 | 0.060 |
| Foam density (core) g/cm$^3$ | 0.060 | 0.090 | 0.081 | 0.076 | 0.073 | 0.071 | 0.066 | 0.063 | 0.049 |
| 50%-compression stress kg/cm$^2$ | 5.4 | 3.9 | 4.2 | 4.5 | 4.6 | 4.9 | 5.2 | 5.2 | 3.2 |
| Plateau value (%) | 74 | 10 | 18 | 23 | 36 | 67 | 70 | 71 | 69 |
| Pack ratio of core portion | 1.0 | 1.50 | 1.35 | 1.26 | 1.22 | 1.19 | 1.10 | 1.05 | 1.08 |
| Aspect ratio | 2.10 | 0.80 | 1.00 | 1.08 | 1.19 | 1.20 | 1.51 | 1.75 | 1.65 |
| Molding method | Free blowing | Full-closed molding | Partial-closed molding | Partial-closed molding | Partial-closed molding | Partial-closed molding | Partial-closed molding | Partial-closed molding | Partial-closed molding |
| Spacing between upper die and lower die | — | 0 | 0.5 | 1.0 | 1.5 | 2.0 | 5.0 | 8.0 | 5.0 |

*[1]Polyhydroxy compound: polyether polyol, GR36B (OH value: 420) manufactured by Takeda Yakuhin Kogyo K.K.
*[2]Polyisocyanate compound: crude diphenylmethane diisocyanate, 44V20 manufactured by Sumitomo Bayer Urethane K.K.
*[3]Foam stabilizer: silicone surfactant, L-5430 manufactured by Nippon Uniker K.K.
*[4]Fire retardant: TMCPP manufactured by Daihachi Kagaku K.K.
*[5]Catalyst: 1:1 mixture of tetramethylhexamethylenediamine, Kaolyzer No. 1 manufactured by Kao K.K. and 33% dipropylene glycol stock solution of triethylene diamine
*[6]Powder: ground calcium carbonate, Whiton SB manufactured by Shiraishi Calcium K.K.

Comparisons $a_1$ and $a_2$

In Comparison $a_1$, the sample was prepared from a slab stock foam obtained by free blowing. On the other hand, in Comparison $a_2$, the sample was prepared from a molding obtained by the blowing and reaction process in a condition where the upper and lower dies A and B are completely closed.

In Comparison $a_1$, the pack ratio was 1.0; the aspect ratio was 2.10; and the plateau value was so large as 74 owing to the free blowing.

Figure 2:
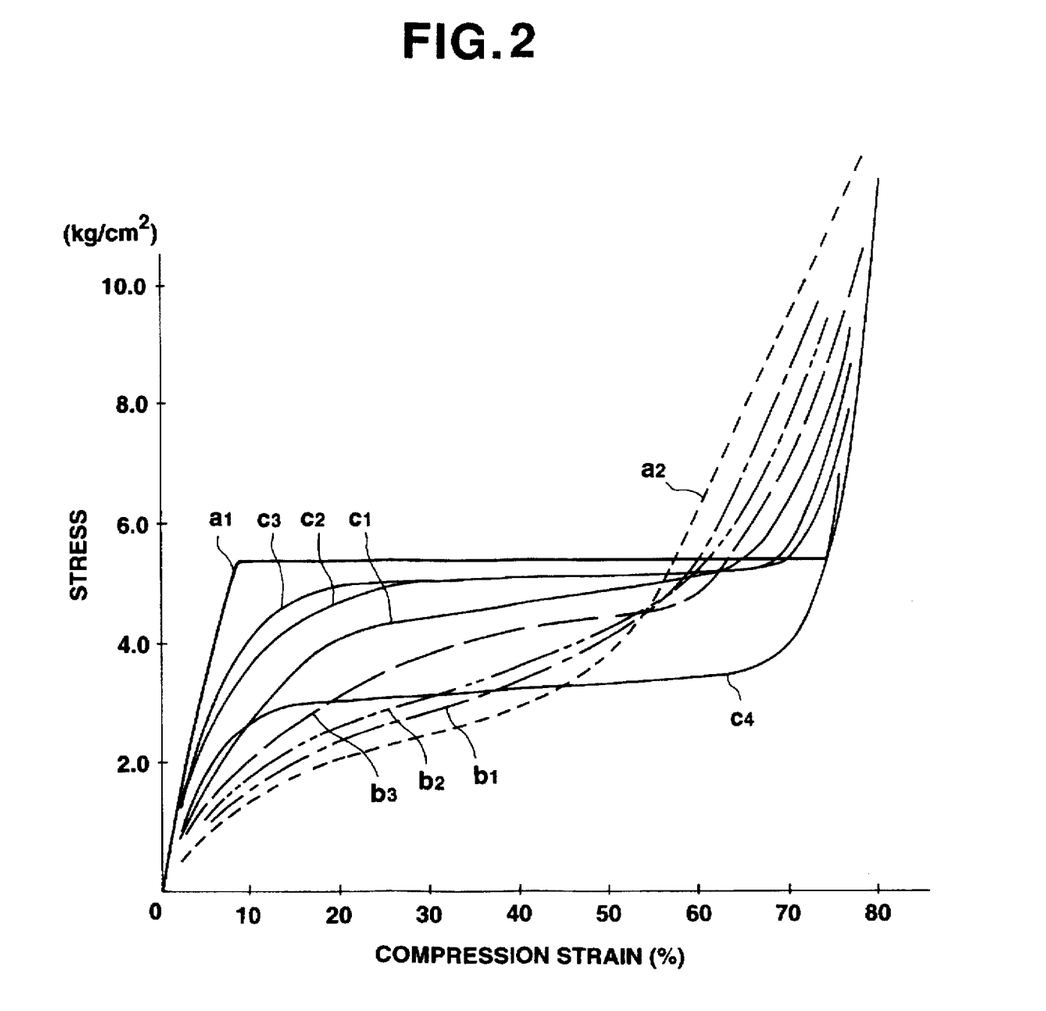
FIG. 2 is a graph showing stress-compression strain curves of energy absorbent pads obtained in Example and Comparison, I.

FIG. 2 shows stress-compression strain curves in Examples $c_1$ to $c_3$ and Comparisons $a_1$ to $b_3$.

The feature of the present invention will now be further described with reference to FIG. 2. Curve $a_1$ shows the characteristic of the slab obtained by the free blowing, in which the length of the plateau portion, or the horizontal portion of Curve $a_1$ is a target plateau value in the present invention.

Curve $a_2$ shows the characteristic of the molding obtained in the completely closed condition of the mood, that is, with no space defined between the upper die A and the lower die B. As a result, no plateau portion is present.

In examining Curves $b_1$ to $c_3$, the pack ratio is gradually decreased in this order to thereby gradually increase the aspect ratio. As a result, the plateau value is gradually increased in this order, and the horizontal portion is reached near the 50%-compression stress. In particular, Curves $c_1$ to $c_3$ respectively corresponding to Examples $c_1$ to $c_3$ show that the stress stability (horizontality of the curves) near the 50%-compression stress is large, and the plateau value is also large (i.e., greatly close to the plateau value of Curve $a_1$). This result proves that the moldings of the present invention are suitable for energy absorbent pads.

Example $c_4$

In Example $c_4$, the amount of water as the blowing agent was changed. The result proves that the change in amount of water can change the 50%-compression stress.

EXAMPLE AND COMPARISON II

Figure 5:
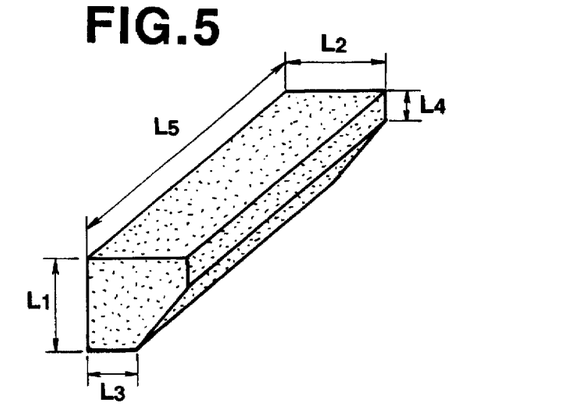
FIG. 5 is an exploded perspective view of a foam obtained by using the mold shown in FIG. 3.

In accordance with the compounding ratios shown in Table 2, various rigid polyurethane foam moldings and a slab stock foam were prepared. The moldings were prepared by using the mold shown in FIG. 3. The dimensions of the mold used are $L_1$=80 mm, $L_2$=50 mm, $L_3$=50 mm, $L_4$=40 mm and $L_5$=270 mm as shown in FIG. 5. On the other hand, the slab stock foam was prepared by first forming a foamed body by free blowing in a box having the dimensions of 200 mm (height)×300 mm×300 mm, and then cutting the foamed body with a cutter to obtain a sample for compression stress measurement. Thereafter, the samples of the moldings and the slab were tested similarly to Example and Comparison, I.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

We claim:

1. A method of manufacturing a rigid polyurethane foam molding for energy absorption, comprising the steps of introducing a rigid polyurethane foam raw material composed primarily of a polyhydroxy compound and a polyisocyanate compound into a cavity in a mold, and blowing and reacting said rigid polyurethane foam raw material in said cavity, wherein a pack ratio of a core portion of said molding ranges from 0.5 to less than 1.2.

2. A method of manufacturing a rigid polyurethane foam molding for energy absorption according to claim 1, wherein said pack ratio ranges from 1.0 to 1.1.

3. A method of manufacturing a rigid polyurethane foam molding for energy absorption according to claim 1, wherein an aspect ratio of a shape of each cell forming said rigid polyurethane foam is 1.2 or more.

4. A method of manufacturing a rigid polyurethane foam molding for energy absorption according to claim 3, wherein said aspect ratio ranges from 1.2 to 10.0.

5. A method of manufacturing a rigid polyurethane foam molding for energy absorption according to claim 4, wherein said aspect ratio ranges from 1.3 to 2.1.

6. A method of manufacturing a rigid polyurethane foam molding for energy absorption according to claim 1, wherein said rigid polyurethane foam raw material is blown and reacted in a condition where an upper die and a lower die of said mold are spaced a distance of 2 mm or more from each other.

7. A method of manufacturing a rigid polyurethane foam molding for energy absorption according to claim 1, wherein

TABLE 2

|  | Example | | | | Comparison | | |
| --- | --- | --- | --- | --- | --- | --- | --- |
|  | 1 | 2 | 3 | 4 | 1 | 2 | 3 |
| Polyhydroxy compound*[1] | 100 | 100 | 100 | 100 | 100 | 100 | 100 |
| Polyisocyanate compound*[2] | 164 | 164 | 164 | 164 | 146 | 146 | 146 |
| Foam stabilizer*[3] | 2 | 2 | 2 | 2 | 2 | 2 | 2 |
| Fire retardant*[4] | 10 | 10 | 10 | 10 | 10 | 10 | 10 |
| Blowing agent (water) | 2.4 | 2.4 | 2.4 | 2.4 | 2.4 | 2.4 | 2.4 |
| Catalyst*[5] | 1 | 1 | 1 | 1 | 1 | 1 | 1 |
| Powder*[6] | 30 | 30 | 30 | 30 | 30 | 30 | 30 |
| Foam density (OA) g/cm$^3$ | 0.080 | 0.072 | 0.056 | 0.040 | 0.060 | 0.102 | 0.080 |
| Foam density (core) g/cm$^3$ | 0.071 | 0.064 | 0.050 | 0.036 | 0.060 | 0.090 | 0.071 |
| 50%-compression stress kg/cm$^2$ | 4.9 | 5.4 | 4.0 | 2.7 | 5.4 | 3.9 | 4.9 |
| Plateau value (%) | 67 | 70 | 72 | 75 | 74 | 10 | 67 |
| Pack ratio of core portion | 1.19 | 1.07 | 0.83 | 0.6 | 1.0 | 1.5 | 1.19 |
| Aspect ratio | 1.2 | 2.6 | 4.3 | 8.4 | 2.10 | 0.80 | 1.2 |
| Fine space in mold shown in FIG. 3 (mm) | −5 mmHg 0.1 mm | −100 mmHg 0.1 mm | −300 mmHg 0.1 mm | −500 mmHg 0.1 mm | Free blowing | full-closed molding | partial-closed molding |
| Flash | slightly thin flash | slightly thin flash | slightly thin flash | slightly thin flash | — | Unobserved | 2 mm considerably observed |

*[1]Polyhydroxy compound: polyether polyol, GR36B (OH value: 420) manufactured by Takeda Yakuhin Kogyo K.K.
*[2]Polyisocyanate compound: crude diphenylmethane diisocyanate, 44V20 manufactured by Sumitoro Bayer Urethane K.K.
*[3]Foam stabilizer: silicone surfactant, L-5430 manufactured by Nippon Uniker K.K.
*[4]Fire retardant: TMCPP manufactured by Daihachi Kagaku K.K.
*[5]Catalyst: 1:1 mixture of tetramethylhexamethylenediamine, Kaolyzer No. 1 manufactured by Kao K.K. and 33% dipropylene glycol stock solution of triethylene diamine
*[6]Powder: ground calcium carbonate, Whiton SB manufactured by Shiraishi Calcium K.K.

said rigid polyurethane foam raw material is introduced into said cavity and said cavity is evacuated.

8. A method of manufacturing a rigid polyurethane foam molding for energy absorption according to claim 7, wherein a reduced pressure in said cavity is maintained in a range of −5 mmHg to about −500 mmHg in performing said step of blowing and reacting said rigid polyurethane foam raw material.

9. A mold for manufacturing a rigid polyurethane foam molding by introducing a rigid polyurethane foam raw material composed primarily of a polyhydroxy compound and a polyisocyanate compound into a cavity defined by separatably joining an upper die and a lower die, and blowing and reacting said rigid polyurethane foam raw material in said cavity, wherein:

said lower die has a lower die cavity for blowing said cavity when said upper die and said lower die are joined together;

a fine space is defined at an outer circumferential edge of an upper end of said lower die cavity so as to communicate with said lower die cavity;

said upper die has a hollow chamber so as to communicate with said cavity through said fine space; and an air pipe is connected at one end thereof to said upper die so as to communicate with said hollow chamber and connected at the other end to an air suction device;

whereby said rigid polyurethane foam raw material is introduced into said cavity and said air suction device is operated to evacuate said cavity through said air pipe, said hollow chamber, and said fine space, to blow and react said raw material, thereby forming said rigid polyurethane foam molding with a core portion having a pack ratio ranging from 0.5 to less than 1.2.

\* \* \* \* \*